(12) United States Patent
Chow

(10) Patent No.: US 12,348,895 B2
(45) Date of Patent: Jul. 1, 2025

(54) VIDEO FRAME TRANSPORT

(71) Applicant: ATI TECHNOLOGIES ULC, Markham (CA)

(72) Inventor: Wing-Chi Chow, Toronto (CA)

(73) Assignee: ATI TECHNOLOGIES ULC, Markham (CA)

( * ) Notice: Subject to any disclaimer, the term of this patent is extended or adjusted under 35 U.S.C. 154(b) by 105 days.

(21) Appl. No.: 18/122,315

(22) Filed: Mar. 16, 2023

(65) Prior Publication Data

US 2024/0314267 A1    Sep. 19, 2024

(51) Int. Cl.
*H04N 7/00* (2011.01)
*H04N 7/01* (2006.01)
*H04N 7/025* (2006.01)

(52) U.S. Cl.
CPC ........... *H04N 7/007* (2013.01); *H04N 7/0122* (2013.01); *H04N 7/025* (2013.01)

(58) Field of Classification Search
CPC ...... H04N 7/0122; H04N 7/01; H04N 7/0127; H04N 7/025; H04N 7/013; H04N 7/007
USPC .......................... 348/441, 445, 458, 459, 913
See application file for complete search history.

(56) References Cited

U.S. PATENT DOCUMENTS

| 2011/0157475 A1* | 6/2011 | Wright | H04H 20/14 348/700 |
| 2013/0100247 A1* | 4/2013 | Tsukagoshi | H04N 21/4858 348/43 |

* cited by examiner

*Primary Examiner* — Sherrie Hsia

(57) ABSTRACT

In response to a video aspect ratio of a frame of video not matching an aspect ratio of a display panel of a display device, a source device of a processing system transmits only the frame to the display device and metadata indicating that the display device is to generate bars for letterboxing or pillarboxing. By generating the bars for letterboxing or pillarboxing at the display device instead of transmitting the bars from the source device to the display device or storing the bars at a frame buffer of the display device, the processing system conserves power and bandwidth.

20 Claims, 7 Drawing Sheets

VIDEO FRAME TRANSPORT

BACKGROUND

A typical processing system employs a parallel processor such as a graphics processing unit (GPU) to generate images for display. Based on commands received from a central processing unit (CPU) or other processing unit, the GPU (which in some cases includes one or more video decoders, scalers, compositors, display encoders, and other components) generates a series of frames and renders the series of frames for a display, such as a computer monitor. The GPU encodes the frames and transmits the frames via an interconnect to the display. The display processes the received encoded data and updates the image at a display panel based on the received data. Each frame of video has a video aspect ratio that is the ratio of the width to height of the frame, usually depicted as X:Y (e.g., 2.4:1), and each display panel has an aspect ratio that is the ratio of the width to height of the display panel (e.g., 16:9). If the video aspect ratio of a video frame does not match the aspect ratio of the display panel, the GPU transmits black bars at the top and bottom of the frame (referred to as letterboxing) and/or black bars at the left and right sides of the frame (referred to as pillarboxing) to the display panel with transmission of the video frame.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Figure 1:
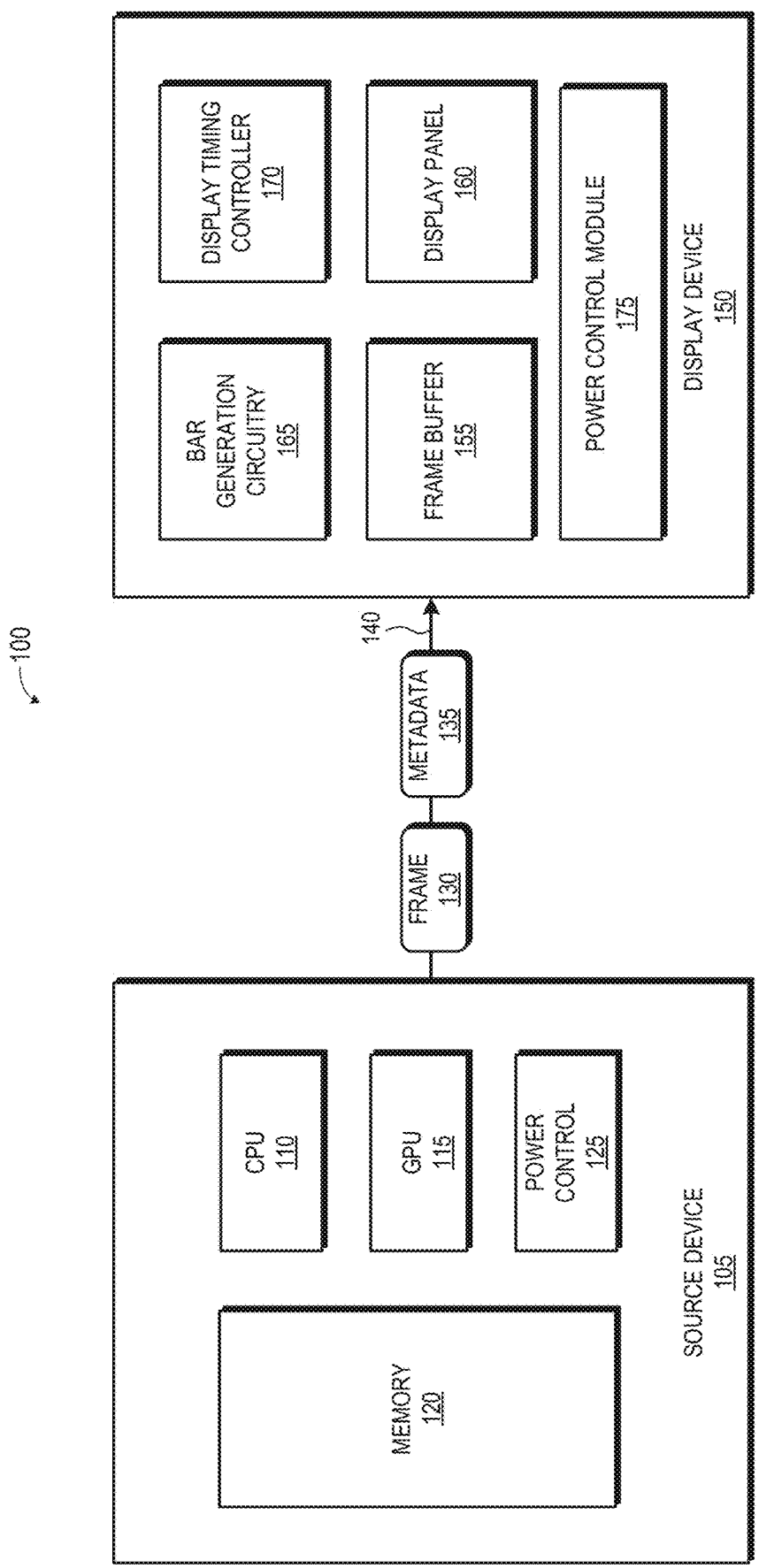
FIG. 1 is a block diagram of a processing system configured to transmit pixel data for a frame and metadata indicating letterboxing and/or pillarboxing to be generated at a display device in accordance with some embodiments.

If the video aspect ratio of a frame transmitted by a source device does not match the aspect ratio of a display panel of a display device (sometimes referred to as a sink device) that displays the frame, the frame can be stretched or zoomed and cropped to fit the aspect ratio of the display panel. Alternatively, to avoid distorting the frame, the source device conventionally adds letterboxing or pillarboxing to the frame to fit the aspect ratio of the display panel. The black bars for letterboxing or pillarboxing are conventionally transmitted with the frame to the display device. However, transmitting the black bars consumes power and bandwidth. In addition, if black bars are not transmitted, artifacts or glitches sometimes appear when entering or exiting a video frame mode that employs letterboxing or pillarboxing, or anytime the video aspect ratio changes.

In some cases, the black bars for letterboxing or pillarboxing are not transmitted with every frame but are instead transmitted with an initial frame and then stored at a frame buffer of the display device, from which they are read back for subsequent frames of the video stream. For example, in an embedded DisplayPort (eDP) mode referred to as "Selective Update" (SU), the source device transmits an initial frame of a video stream with bars for letterboxing or pillarboxing and with metadata referred to as secondary data packets (SDPs) to the display device. The SDPs instruct the display device to store the initial frame and the bars at a frame buffer of the display device. The source device transmits subsequent frames of the video stream without bars for letterboxing or pillarboxing and with SDPs that instruct the display device to read the bars from the frame buffer for display with the subsequent frames. In particular, the SDPs inform the display device about which areas of the display frame are updated from the previous frame and which areas of the display frame (e.g., the bars for letterboxing or pillarboxing) are to be read from the frame buffer. However, storing the black bars at the frame buffer consumes memory and writing and reading the black bars to and from the frame buffer consumes power.

Some source devices employ VESA display stream compression (DSC), a video compression algorithm that divides a frame into equal size slices forming a rectangular grid along the vertical and horizontal directions. If DSC is used with SU, an entire slice is required to be transmitted to the display device, resulting in transmission of slices that include portions of the black bars for letterboxing if the slice boundary and the edge of the black bars do not align.

FIGS. 1-8 illustrate techniques for transmitting only a frame of a video stream from a source device to a display device of a processing system and instructing the display device to generate bars for letterboxing or pillarboxing in response to an aspect ratio of a display panel not matching a video aspect ratio of the frame. In some embodiments, the display device transmits information regarding the aspect ratio of the display panel and the capabilities of the display device to the source device. The source device compares the aspect ratio of the display panel to the video aspect ratio of a frame. If the aspect ratios differ, the source device transmits the frame and metadata to the display device. In some embodiments, the metadata indicates that the display panel is to generate at least one of letterboxing and pillarboxing for the video frame. In some embodiments, the metadata also indicates a start position of the video frame relative to the display panel and either the size of the video frame or an end position of the video frame relative to the display panel.

Based on the metadata, the display device generates bars for letterboxing or pillarboxing. In some embodiments, the generated bars are colored black by default, and in other embodiments, the metadata specifies a color value for the generated bars, providing flexibility for additional color options. In some embodiments, the display device generates the bars at the last stage of the display device's pipeline. By bypassing transmitting the bars for letterboxing or pillarboxing from the source device to the display device, the processing system saves power and bandwidth. For example, during the intervals where bars for letterboxing or pillarboxing would have been transmitted in a conventional processing system, one or more portions of the source device, the display device, and the display link can be placed in a low power state.

Generating the bars for letterboxing or pillarboxing at the display device also saves power compared to storing the bars at the frame buffer and reading out the bars for each successive frame, as is conventionally done for Selective Update.

FIG. 1 illustrates a processing system 100 configured to transmit pixel data for a frame from a source device 105 to a display device 150 that generates bars for letterboxing or pillarboxing if an aspect ratio of a display panel 160 of the display device 150 differs from a video aspect ratio of the frame in accordance with some embodiments. The source device 105 includes any of a variety of devices used to generate video content, including a notebook computer, a desktop computer, a server, a game console, a compute-enabled smartphone, and the like. The display device 150 includes a digital display device to display video content, such as a notebook computer screen, digital television, computer monitor, portable device display, and the like. Note that the source device 105 and the display device 150, in some implementations, are implemented in the same device, such as in the case of a tablet computer, notebook computer, compute-enabled phone, and the like.

The processing system 100 is generally configured to execute sets of instructions (e.g., computer programs) to carry out specified tasks for an electronic device. Examples of such tasks include controlling aspects of the operation of the electronic device, displaying information to a user to provide a specified user experience, communicating with other electronic devices, and the like. To support execution of the sets of instructions, the source device 105 includes at least one memory 120 and at least one processor, such as a central processing unit (CPU) 110. In some embodiments, each processor includes one or more processor cores, each processor core having one or more instruction pipelines to fetch instructions, decode the instructions into corresponding operations, dispatch the operations to one or more execution units, execute the operations, and retire the operations. In the course of executing instructions, the processors generate graphics operations and other operations associated with the visual display of information. Based on these operations, the processors provide commands and data to a parallel processor, such as a graphics processing unit (GPU) 115.

The GPU 115 is generally configured to receive the commands and data associated with graphics and other display operations from the plurality of processor cores. Based on the received commands, the GPU 115 executes operations to generate frames for display. Examples of operations include vector operations, drawing operations, video decoder operations, and the like.

In some embodiments, the display device 150 includes a frame buffer 155, a display timing controller 170, bar generation circuitry 165, and a display panel 160. The source device and display device further include interfaces (not shown) that include wired or wireless interconnect interfaces, such as HDMI interfaces, DisplayPort interfaces, embedded DisplayPort (eDP) interfaces, and the like. The display panel 160 includes a two-dimensional array of pixels used to display a sequence of display images, and includes, for example, a light emitting diode (LED) matrix, an organic LED (OLED) matrix, a liquid crystal (LC) matrix, a matrix of movable mirrors for a digital light processing (DLP) display, or the like.

The display timing controller 170 is generally configured to control the display of frames at the display panel 160. The display timing controller 170 is implemented as hard-coded or programmable logic, one or more processors executing software/firmware instructions, or any combination thereof. In some embodiments, the display timing controller 170 performs operations including buffering of frames generated by the GPU 115 at the frame buffer 155.

The frame buffer 155 holds a frame of pixel data. In some embodiments, the pixel data stored at the frame buffer 155 is compressed using a compression algorithm such as, for example, VESA Display Stream Compression (DSC). The display timing controller 170 reads the stored pixel data from the frame buffer 155 at an interval based on the current programming of the panel refresh rate.

As a general operational overview, the memory 120 stores one or more sets of executable software instructions to manipulate the CPU 110 and GPU 115 to render a video stream including a series of display frames such as display frame 130 and corresponding metadata 135 and to transmit this video stream to the display device 150 via the display interfaces and a display link 140. At the display device 150, the display timing controller 170 receives each display frame and corresponding metadata in turn and processes the display frame for display in sequence at the display panel 160 during a corresponding frame period. As will be appreciated by one skilled in the art, the display device 150 is generally configured to display the most recent frame generated by the GPU 115 by refreshing the display panel 160 using the pixel data that the display device 150 receives from the GPU 115.

Each frame generated by the GPU 115 includes a vertical active region and a vertical blanking region. The vertical active region includes pixel data that make up the image to be displayed at the display panel 160. The vertical blanking region includes metadata such as audio packets or information indicating how the display device 150 is to interpret the pixel data. During the period of time in which the display timing controller 170 reads the vertical blanking region (referred to as the vertical blanking period), the display panel 160 displays the image that was last transmitted by the GPU 115 in the previous vertical active region.

To conserve power, in response to determining that the aspect ratio of the display panel 160 and the video aspect ratio of the display frame 130 do not match, the source device 105 transmits only the display frame 130 with metadata 135 indicating that the display device 150 is to generate bars for letterboxing or pillarboxing for the display frame 130. Because the source device 105 no longer transmits the bars for letterboxing or pillarboxing, the vertical blanking region, during which one or more portions of the source device 105 are placed in a reduced power state, is extended. Thus, rather than transmitting bars for letterboxing or pillarboxing to the display device 150, the source device 105 instead transmits only the display frame 130 and metadata 135 and gains time in which to place components of the source device 105 in a reduced power state.

In an eDP mode referred to as "Selective Update" (SU), the source device 105 transmits an initial frame of a video stream that includes multiple frames with bars for letterboxing or pillarboxing with metadata referred to as secondary data packets (SDPs) to the display device 150. The SDPs instruct the display device 150 to store the initial frame and the bars at the frame buffer 155. The source device 105 transmits subsequent frames of the video stream without bars for letterboxing or pillarboxing and with SDPs that instruct the display device 150 to read the bars from the frame buffer 155 for display with the subsequent frames. In particular, the SDPs inform the display device 150 about which areas of the display frame are updated from the previous frame and which areas of the display frame (e.g., the bars for letterboxing or pillarboxing) are to be read from the frame buffer 155.

In some embodiments, the GPU 115 uses the extended vertical blanking period to reduce power to components of the source device 105 such as the memory 120 and one or both of the display interfaces. For example, in some embodiments the GPU 115 includes a power control module 125 that controls a power mode of portions of the source device 105 such as the memory 120 and the display interface. In some embodiments, the power control module 125 also controls a power mode of portions of the display device 150 such as the display interface, and in other embodiments, the display device 150 includes a separate power control module 175. The power control modules 125, 175 are implemented as circuitry, hard-coded or programmable logic, one or more processors executing software/firmware instructions, or any combination thereof. The power control module 125 determines a threshold time required to reduce power from an operating power state to a reduced power state and to subsequently restore power to the operating power state for portions of the source device 105. If the length of the extended vertical blanking period exceeds the threshold time, the power control module 125 reduces power to one or more portions of the source device 105 (and, in some embodiments, to the display interface) and subsequently restores power to the one or more portions of the source device 105 to the operating power state during the extended vertical blanking period. In this way, the GPU 115 conserves power by bypassing transmitting bars for letterboxing or pillarboxing to the display device 150 and extending the vertical blanking period.

Figure 2:
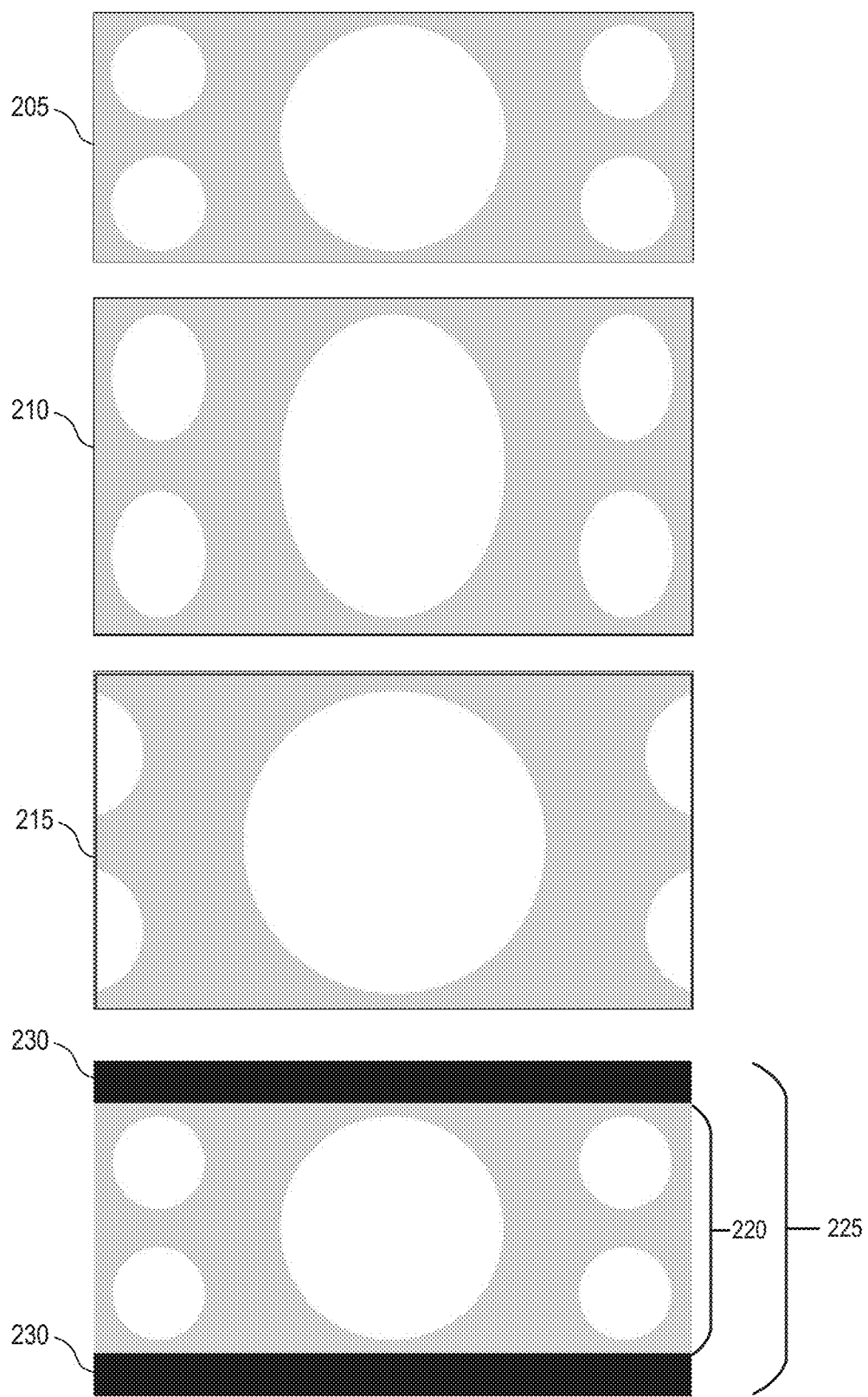
FIG. 2 is a diagram illustrating differences in aspect ratios for a frame and a display panel requiring letterboxing in accordance with some embodiments.

FIG. 2 is a diagram illustrating differences in aspect ratios for a frame and a display panel requiring letterboxing in accordance with some embodiments. A frame 205 has a video aspect ratio of 2.4:1. To fit a display panel having an aspect ratio of 16:9, one option is to stretch the frame, as illustrated by stretched frame 210. However, the image is distorted by the stretching. Another option for fitting the frame 205 to a display panel having an aspect ratio of 16:9 is to zoom and crop the frame 205, as illustrated by zoomed and cropped frame 215; however, zooming and cropping results in lost image data for the right and left edges of the frame 205. To maintain the image quality of the frame 205 while fitting the frame 205 to a display panel having an aspect ratio of 16:9, the display device 150 centers the frame 205 within the display panel 160 and generates bars 230 at the top and bottom of the frame 205 to create letterboxing fill in the unused portions of the display panel 160. Thus, the frame 205 occupies a height 220, and the bars 230 generated by the display device 150 occupy the remainder of a height 225 of the display panel. In some embodiments, the bars are black, and in other embodiments, the bars are a different color. In some embodiments, the frame 205 has a video aspect ratio other than 2.4:1 and/or the display panel has an aspect ratio other than 16:9.

Figure 3:
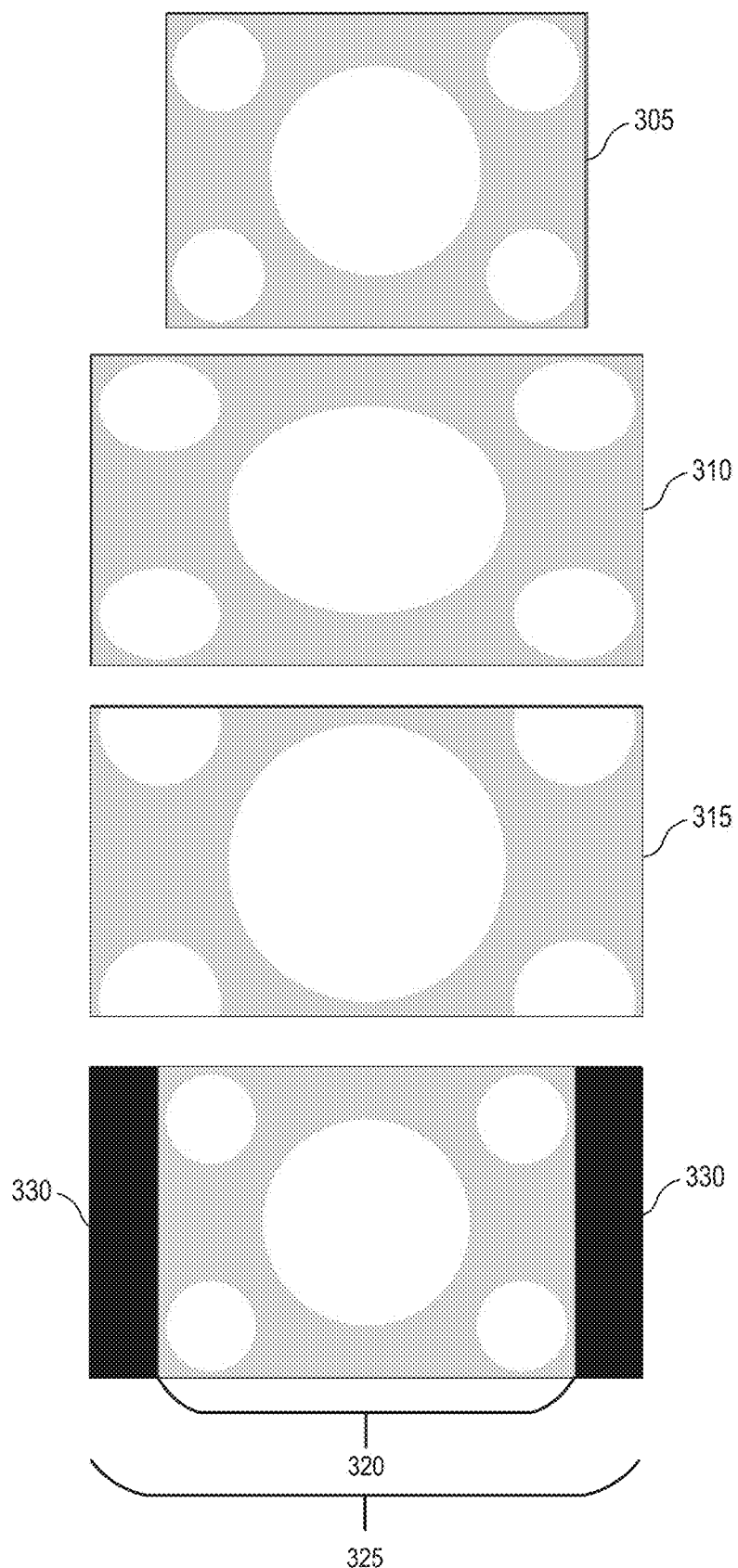
FIG. 3 is a diagram illustrating differences in aspect ratios for a frame and a display panel requiring pillarboxing in accordance with some embodiments.

FIG. 3 is a diagram illustrating differences in aspect ratios for a frame and a display panel requiring pillarboxing in accordance with some embodiments. A frame 305 has a video aspect ratio of 4:3. To fit a display panel having an aspect ratio of 16:9, one option is to stretch the frame, as illustrated by stretched frame 310. However, the image is distorted by the stretching. Another option for fitting the frame 305 to a display panel having an aspect ratio of 16:9 is to zoom and crop the frame 305, as illustrated by zoomed and cropped frame 315; however, zooming and cropping results in lost image data for the top and bottom edges of the frame 305. To maintain the image quality of the frame 305 while fitting the frame 305 to a display panel having an aspect ratio of 16:9, the display device 150 centers the frame 305 within the display panel 160 and generates black bars 330 at the left and right of the frame 305 to fill in the unused portions of the display panel 160. Thus, the frame 305 occupies a width 320, and the black bars 330 generated by the display device 150 occupy the remainder of a width 325 of the display panel. In some embodiments, the frame 305 has a video aspect ratio other than 4:3 and/or the display panel has an aspect ratio other than 16:9.

Figure 4:
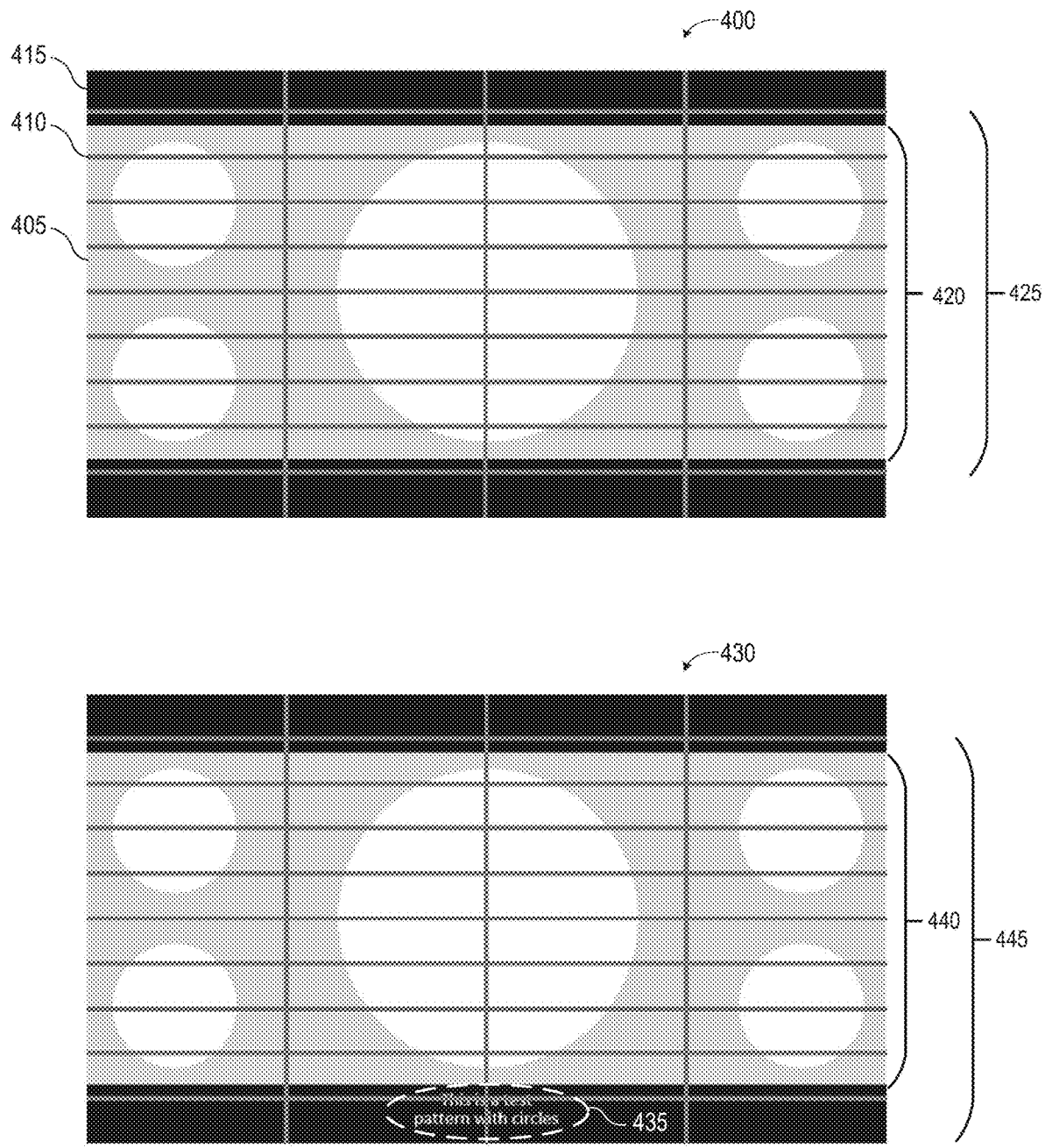
FIG. 4 is a diagram illustrating display stream compression with letterboxing and closed captioning.

FIG. 4 is a diagram illustrating display stream compression (DSC) with letterboxing and closed captioning. A frame 400 is divided into equal size slices, such as slice 405. The slices are divided by slice boundaries such as slice boundary 410. In the illustrated example, the black bars 415 for letterboxing do not align with the slice boundaries. Because transmission of partial slices is not possible using DSC, if the frame 400 is transmitted using conventional methods of selective update (SU), the second row and second-to-last row of the frame 400 must be transmitted to the display device, even though those rows are partially occupied by the black bars 415. Thus, instead of transmitting only a desired update height 420, the source device 105 must transmit an actual update height 425, resulting in wasteful transmission of portions of the black bars 415.

Similar to frame 400, frame 430 is also divided into equal size slices having slice boundaries, and further includes closed captioning 435. In the illustrated example, the closed captioning 435 extends over two rows of slices and presents a further impediment to performing SU with DSC, as the bottom two rows of slices must be transmitted to the display device 150 for every frame to display the closed captioning 435 for each frame. Thus, instead of transmitting a desired update height 440, the source device 105 must transmit an actual update height 445.

By generating the black bars 415 at the display device 150 as described herein, the black bars 415 are made to align with the slices of the frame 400. In some embodiments, the source device 105 applies DSC by selecting a slice size that divides the frame (without letterboxing) into slices having equal heights. The source device 105 also aligns any closed captioning 435 to fit within the frame 400 without letterboxing. The source device 105 transmits only the frame 400 with any closed captioning 435 but without unnecessary letterboxing to the display device 150 with metadata indicating that the display device 150 is to generate the black bars 415 for letterboxing. In this manner, the amount of data transmitted from the source device 105 to the display device 150 is reduced.

Figure 5:
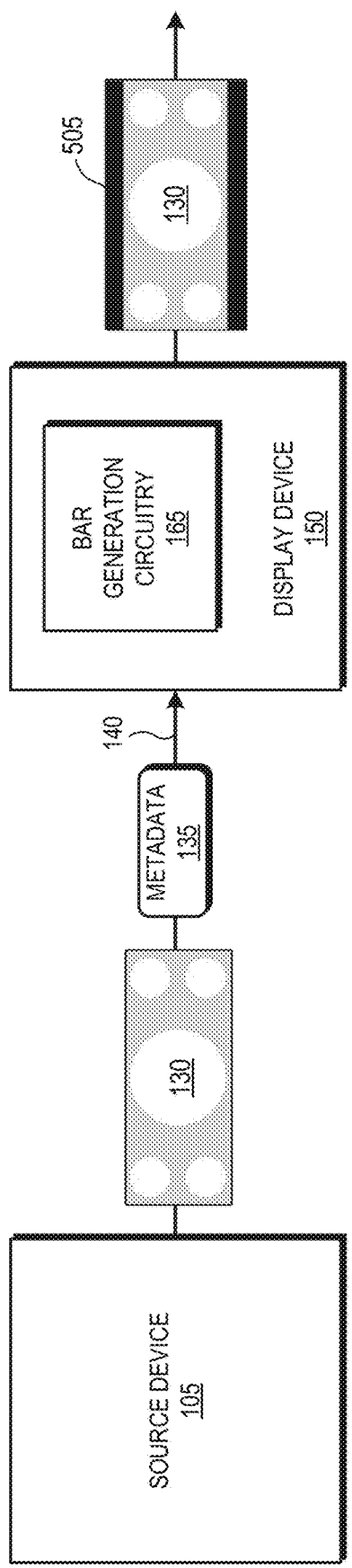
FIG. 5 is a block diagram illustrating a source device transmitting a frame and metadata for a display device to generate letterboxing in accordance with some embodiments.

FIG. 5 is a block diagram illustrating the source device 105 transmitting the metadata 135 and the frame 130 for the display device 150 to generate bars for letterboxing in accordance with some embodiments. In response to receiving the frame 130 and metadata 135 via the display link 140, the bar generation circuitry 165 generates bars 505 for letterboxing for the frame 130 such that the combination of the bars 505 and the frame 130 fills the display panel 160 without distorting the frame 130. Because the source device 105 bypasses transmitting the bars 505 for letterboxing to the display device 150, portions of the source device 105, the display device 150, and the display link 140 can be put in a low power state during the interval when the bars 505 would otherwise have been transmitted.

Figure 6:
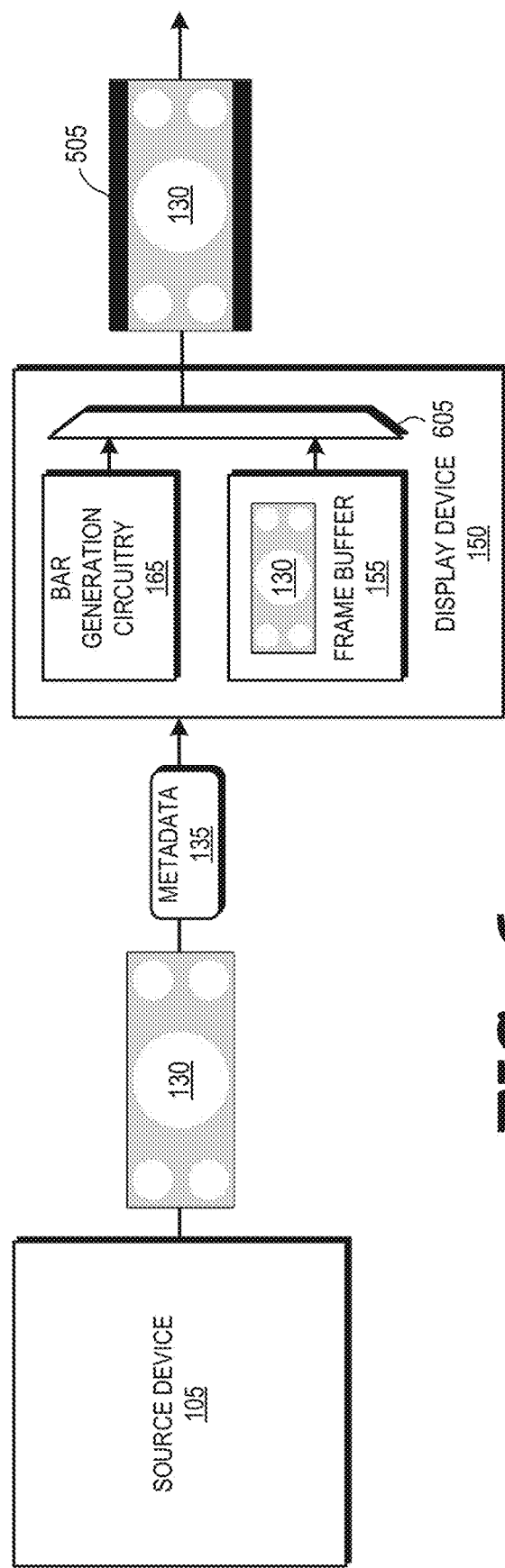
FIG. 6 is a block diagram illustrating a display device storing a frame received from a source device at a frame buffer and generating letterboxing for display with the frame in accordance with some embodiments.

FIG. 6 is a block diagram illustrating the display device 150 storing the frame 130 received from the source device 105 at the frame buffer 155 and generating bars for letterboxing for display with the frame 130 in accordance with some embodiments. Similar to FIG. 5, the source device 105 transmits the frame 130 to the display device 150 and metadata 135 indicating that the display device 150 is to generate bars for letterboxing. In some applications, such as panel replay, self-refresh mode, and Fast Transport, the display device 150 stores the frame 130 at the frame buffer, from which the frame 130 is subsequently read out for display at the display panel 160.

Rather than transmitting the bars 505 for letterboxing from the source device 105 to the display device 150 together with the frame 130 and storing the bars 505 at the frame buffer 155, the bar generation circuitry 165 generates the bars 505 based on the metadata 135. The display device 150 multiplexes the bars 505 generated by the bar generation circuitry 165 and the frame 130 read out from the frame buffer 155 at a multiplexer 605 to display the frame 130 and bars 505 for letterboxing at the display panel 160. By storing only the frame 130 at the frame buffer 155 and generating the bars 505 at the bar generation circuitry 165, the display device 150 obviates the need to write or read back the bars 505 from the frame buffer 155. In some embodiments, the power control module 175 places the unused portion of the frame buffer 155 in a low power state, thus saving power.

Figure 7:
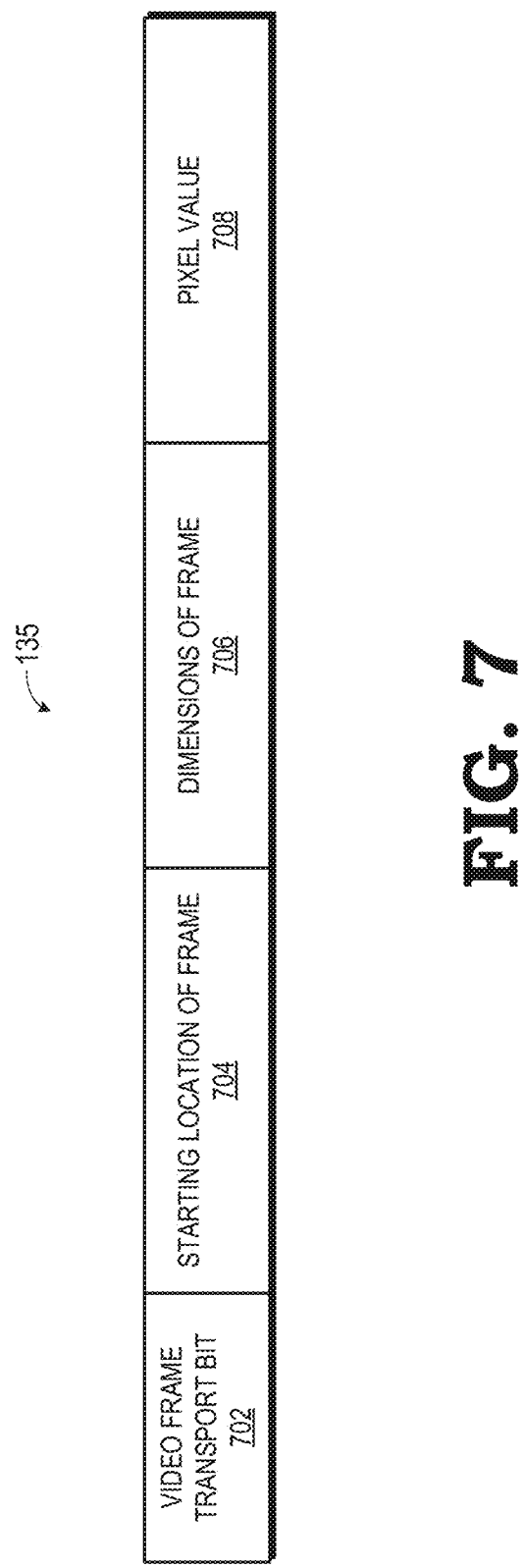
FIG. 7 is a block diagram of an example of metadata indicating that a display device is to generate bars for letterboxing or pillarboxing for a frame in accordance with some embodiments.

FIG. 7 is a block diagram of an example of an instruction included in metadata 135 indicating that the display device 150 is to generate bars for letterboxing and/or pillarboxing for a frame in accordance with some embodiments. The metadata 135 includes a video frame transport bit 702 indicating whether the display device 150 will be instructed to generate bars for letterboxing and/or pillarboxing. For example, if the video frame transport bit 702 is asserted (e.g., has a value of 1), the display device 150 will be instructed to generate bars for letterboxing and/or pillarboxing. If the video frame transport bit 702 is unasserted (e.g., has a value of 0), letterboxing and pillarboxing are not needed, because, e.g., the video aspect ratio matches the aspect ratio of the display panel 160.

The metadata 135 further includes a portion indicating the starting location 704 of a frame with respect to the display panel 160 and a portion indicating the dimensions 706 of the frame. The combination of the starting location 704 and the dimensions 706 of the frame inform the bar generation circuitry 165 which pixels of the display panel (i.e., those pixels outside the area of the frame) to which a value is to be applied to generate the bars for letterboxing and/or pillarboxing. In some embodiments, the metadata 135 further includes a portion indicating the pixel value 708 that the bar generation circuitry 165 is to apply to generate the bars. If the metadata 135 does not include the portion indicating the pixel value 708, the bar generation circuitry 165 applies a value for black to the pixels of the display panel 160 that are outside the area of the frame. In embodiments in which the metadata 135 includes the portion indicating the pixel value 708, the bar generation circuitry 165 applies the indicated value to the pixels of the display panel 160 that are outside the area of the frame, allowing for any selected pixel value (e.g., color) to be applied to letterboxing and pillarboxing.

In some embodiments, the source device 105 sends the metadata 135 with each frame of a video stream that requires bars to be generated for letterboxing and/or pillarboxing. In other embodiments, the source device 105 sends the metadata 135 with the video frame transport bit 702 asserted with a first frame of a video stream of frames having the same starting locations and dimensions for which the display device 150 is to generate bars for letterboxing or pillarboxing. If the starting location and dimensions of frames of the video stream change such that the video aspect ratio still does not match the aspect ratio of the display panel 160, but the dimensions of the bars for letterboxing or pillarboxing have changed, the source device 105 sends a second instruction with metadata for which the video frame transport bit 702 is asserted to indicate that the display device 150 needs to generate bars for letterboxing or pillarboxing with an updated start location 704 of the frame and dimensions 706 of the frame. If the starting location and dimensions of frames of the video stream change such that the video aspect ratio matches the aspect ratio of the display panel 160, the source device 105 sends a second instruction with metadata for which the video frame transport bit 702 is unasserted to indicate that the display device 150 no longer needs to generate bars for letterboxing or pillarboxing. In some embodiments, the source device 105 transmits an instruction included in metadata 135 for each frame of a video stream that requires bars to be generated for letterboxing and/or pillarboxing.

Figure 8:
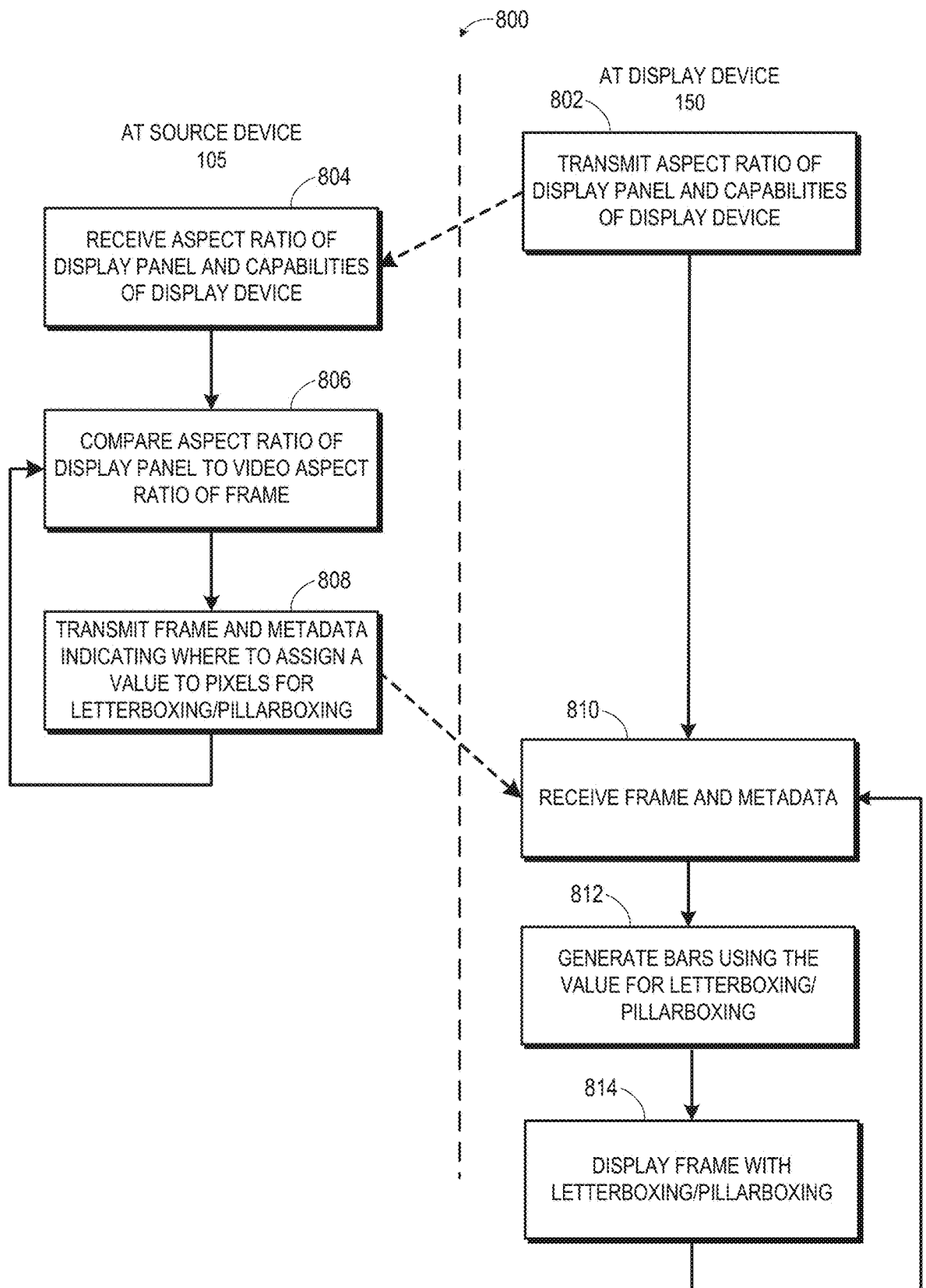
FIG. 8 is a flow diagram illustrating an example method for instructing a display device to generate letterboxing and/or pillarboxing for a frame in accordance with some embodiments.

FIG. 8 is a flow diagram illustrating an example method 800 for instructing the display device 150 to generate letterboxing and/or pillarboxing for a frame in accordance with some embodiments. At block 802, the display device 150 transmits to the source device 105 an indication of the aspect ratio of the display panel 160 and that the display device 150 is capable of supporting generation of bars for letterboxing and/or pillarboxing. In some embodiments, the indication is metadata formatted according to the VESA DisplayID (DID) or Extended Display Identification Data (EDID) standards and indicates the native capabilities of the display panel 160. The DID or EDID data informs the source device 105 of the resolutions, timings, and bit depths that are supported by the display panel 160.

At block 804, the source device 105 receives the aspect ratio and capabilities of the display device 150. At block 806, the source device 105 uses the information from the EDID data to compare the aspect ratio of the display panel 160 to the video aspect ratio of the frame 130, from which the source device 105 determines the starting location of the frame 130 with respect to the display panel 160, such that the frame 130 is centered vertically and horizontally within the display panel 160. If the aspect ratio of the display panel 160 does not match the video aspect ratio of the frame 130 (e.g., if the starting location is anything other than 0,0), the method flow continues to block 808.

At block 808, the source device 105 transmits the frame 130 and metadata 135 indicating that the display device 150 is to generate bars for letterboxing and/or pillarboxing. In some embodiments, the metadata 135 includes a pixel value 708 that the display device 150 is to apply to the pixels of the bars 505 for letterboxing and/or pillarboxing. If the metadata 135 does not include the pixel value 708, the default value is black.

At block 810, the display device 150 receives the frame 130 and metadata 135. At block 812, the bar generation circuitry 165 generates bars 505 for the frame 130 based on the metadata 135. If the metadata 135 includes the pixel value 708, the bar generation circuitry 165 applies the indicated pixel value 708 to the pixels of the display panel 160 outside the area of the frame 130 to generate the bars 505. If the metadata 135 does not include a pixel value 708, the bar generation circuitry 165 applies a black pixel value to the pixels of the display panel 160 outside the area of the frame 130 to generate the bars 505. At block 814, the display device 150 displays the frame 130 with the bars 505 for letterboxing and/or pillarboxing.

In some embodiments, the apparatus and techniques described above are implemented in a system including one or more integrated circuit (IC) devices (also referred to as integrated circuit packages or microchips), such as the processing system described above with reference to FIGS. 1-8. Electronic design automation (EDA) and computer aided design (CAD) software tools may be used in the design and fabrication of these IC devices. These design tools typically are represented as one or more software programs. The one or more software programs include code executable by a computer system to manipulate the computer system to operate on code representative of circuitry of one or more IC devices so as to perform at least a portion of a process to design or adapt a manufacturing system to fabricate the circuitry. This code can include instructions, data, or a combination of instructions and data. The software instructions representing a design tool or fabrication tool typically are stored in a computer readable storage medium accessible to the computing system. Likewise, the code representative of one or more phases of the design or fabrication of an IC device may be stored in and accessed from the same computer readable storage medium or a different computer readable storage medium.

A computer readable storage medium may include any non-transitory storage medium, or combination of non-transitory storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

In some embodiments, certain aspects of the techniques described above may be implemented by one or more processors of a processing system executing software. The software includes one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:
in response to an aspect ratio of a video frame not matching an aspect ratio of a display panel of a display device, transmitting the video frame from a source device to the display device with metadata indicating that the display device is to generate bars for at least one of letterboxing and pillarboxing for the video frame.

2. The method of claim 1, wherein the metadata further indicates:
a start position of the video frame relative to the display panel; and
one or more of a size of the video frame and an end position of the video frame relative to the display panel.

3. The method of claim 1, wherein the metadata further indicates a value the display device is to apply to pixels of the display panel for the at least one of letterboxing and pillarboxing for the video frame.

4. The method of claim 1, further comprising:
bypassing transmitting bars for letterboxing and pillarboxing from the source device to the display device.

5. The method of claim 4, further comprising:
placing at least a portion of at least one of the source device, the display device, and a link connecting the source device to the display device in a low power state.

6. The method of claim 1, further comprising:
bypassing saving letterboxing and pillarboxing to a frame buffer of the display device.

7. The method of claim 6, further comprising:
placing at least a portion of the frame buffer of the display device in a low power state.

8. The method of claim 1, further comprising:
dividing the video frame into slices having equal heights for display stream compression.

9. A device, comprising:
a source device configured to:
 transmit a video frame to a display device; and
 transmit metadata indicating that the display device is to generate at least one of letterboxing and pillarboxing for the video frame in response to an aspect ratio of the video frame not matching an aspect ratio of a display panel of the display device.

10. The device of claim 9, wherein the metadata further indicates:
a start position of the video frame relative to the display panel; and
one or more of a size of the video frame and an end position of the video frame relative to the display panel.

11. The device of claim 9, wherein the metadata further indicates a value the display device is to apply to pixels of the display panel for the at least one of letterboxing and pillarboxing for the video frame.

12. The device of claim 9, further comprising:
bypassing transmitting letterboxing and pillarboxing from the source device to the display device.

13. The device of claim 12, further comprising:
placing at least a portion of at least one of the source device, the display device, and a link connecting the source device to the display device in a low power state.

14. The device of claim 9, further comprising:
bypassing saving letterboxing and pillarboxing to a frame buffer of the display device.

15. The device of claim 14, further comprising:
placing at least a portion of the frame buffer of the display device in a low power state.

16. The device of claim 9, further comprising:
dividing the video frame into slices having equal heights for display stream compression.

17. A method comprising:
receiving, at a display device, a video frame from a source device with metadata indicating that the display device is to generate bars for at least one of letterboxing and pillarboxing for the video frame in response to an aspect ratio of the video frame not matching an aspect ratio of a display panel of the display device.

18. The method of claim 17, further comprising:
generating, at the display device, the bars for at least one of letterboxing and pillarboxing for the video frame in response to receiving the metadata.

19. The method of claim 18, wherein generating the bars comprises assigning a value indicated by the metadata to pixels of the display panel that are outside an area of the video frame.

20. The method of claim 17, wherein the metadata further indicates:
a start position of the video frame relative to the display panel; and
one or more of a size of the video frame and an end position of the video frame relative to the display panel.

* * * * *